United States Patent
Hagelstrom et al.

(10) Patent No.: US 10,721,213 B1
(45) Date of Patent: Jul. 21, 2020

(54) IP SOURCE OBFUSCATION

(71) Applicant: Architecture Technology Corporation, Eden Prairie, MN (US)

(72) Inventors: Ryan L. Hagelstrom, Chaska, MN (US); Ranga S. Ramanujan, Medina, MN (US); Nathan E. Bahr, Eden Prairie, MN (US)

(73) Assignee: Architecture Technology Corporation, Eden Prairie, MN (US)

( * ) Notice: Subject to any disclaimer, the term of this patent is extended or adjusted under 35 U.S.C. 154(b) by 328 days.

(21) Appl. No.: 15/611,127

(22) Filed: Jun. 1, 2017

Related U.S. Application Data

(60) Provisional application No. 62/344,058, filed on Jun. 1, 2016.

(51) Int. Cl.
  *H04L 29/06* (2006.01)
  *H04L 12/18* (2006.01)
  *H04L 12/741* (2013.01)
  *G06F 21/60* (2013.01)

(52) U.S. Cl.
  CPC ........ *H04L 63/0414* (2013.01); *G06F 21/606* (2013.01); *H04L 12/18* (2013.01); *H04L 45/74* (2013.01)

(58) Field of Classification Search
  CPC ..... H04L 63/0414; H04L 12/18; H04L 45/74; G06F 21/606
  See application file for complete search history.

(56) References Cited

U.S. PATENT DOCUMENTS

| | | | | |
|---|---|---|---|---|
| 6,606,706 B1* | 8/2003 | Li | ............ | H04L 12/18 713/153 |
| 6,870,842 B1* | 3/2005 | Caronni | ............ | H04L 12/18 370/390 |
| 7,079,495 B1* | 7/2006 | Pearce | ............ | H04L 12/1818 340/3.52 |
| 7,388,869 B2* | 6/2008 | Butehorn | ............ | H04B 7/1856 370/230 |
| 7,561,570 B2* | 7/2009 | Kondo | ............ | H04L 12/1836 370/392 |
| 8,090,805 B1* | 1/2012 | Chawla | ............ | H04L 12/00 709/221 |

(Continued)

OTHER PUBLICATIONS

U.S. Patent and Trademark Office, "Office Action", U.S. Appl. No. 15/611,106, dated Mar. 7, 2019, pp. 1-13.
Audet, F., "Network Address Translation (NAT) Behavioral Requirements for Unicast UDP" RFC 4787, Jan. 2007, pp. 1-29, USA.

(Continued)

*Primary Examiner* — Michael R Vaughan
(74) *Attorney, Agent, or Firm* — Carlson, Caspers, Vandenburgh & Lindquist, P.A.

(57) ABSTRACT

A method of obfuscating a source of a multicast packet is provided. The method includes receiving a plurality of multicast packets at a first device from one or more second devices, the multicast packets received over one or more network links. A source internet protocol (IP) address of each multicast packet of the plurality of multicast packets is an IP address of the one or more second devices that sent the multicast packet. The source IP address of each of the plurality of multicast packets is changed to an IP address other than an IP address of the first device or an IP address of the one or more second devices. The plurality of multicast packets can then be sent.

20 Claims, 3 Drawing Sheets

(56) References Cited

U.S. PATENT DOCUMENTS

| | | | |
|---|---|---|---|
| 8,434,139 B1* | 4/2013 | Ortiz, Jr. | H04L 63/029 709/227 |
| 9,025,600 B1* | 5/2015 | Vitt | H04L 12/18 370/390 |
| 9,641,434 B1* | 5/2017 | Laurence | H04L 45/7453 |
| 9,860,169 B1 | 1/2018 | Ninan et al. | |
| 9,998,955 B1* | 6/2018 | MacCarthaigh | H04L 69/22 |
| 10,097,454 B1* | 10/2018 | MacCarthaigh | H04L 45/74 |
| 2002/0138575 A1* | 9/2002 | Hirata | H04L 12/18 709/205 |
| 2002/0186694 A1 | 12/2002 | Mahajan et al. | |
| 2003/0123453 A1 | 7/2003 | Ooghe et al. | |
| 2005/0089050 A1* | 4/2005 | Cheriton | H04L 12/18 370/397 |
| 2008/0062861 A1 | 3/2008 | Shand et al. | |
| 2009/0067330 A1 | 3/2009 | Shand et al. | |
| 2014/0086243 A1* | 3/2014 | Shepherd | H04L 45/16 370/390 |
| 2015/0146603 A1 | 5/2015 | Wu et al. | |
| 2016/0105399 A1* | 4/2016 | Rung | H04L 63/0407 726/26 |
| 2016/0127306 A1* | 5/2016 | Wang | H04L 67/16 370/390 |
| 2017/0118176 A1* | 4/2017 | Okhravi | H04L 63/0428 |
| 2019/0014092 A1* | 1/2019 | Malek | H04L 63/0471 |

OTHER PUBLICATIONS

Rekhter, Y., "Address Allocation for Private Internets" RFC 1918, Network Working Group, Feb. 1996, pp. 1-9, USA.

Rosenberg, J., "Session Traversal Utilities for NAT (STUN)" RFC 5389, Network Working Group, Oct. 2008, pp. 1-51, USA.

Rosenberg, J., "STUN—Simple Traversal of User Datagram Protocol (UDP) Through Network Address Translators (NATs)" RFC 3489, Network Working Group, Mar. 2003, pp. 1-47, USA.

Srisuresh, P., "IP Network Address Translator (NAT) Terminology and Considerations" RFC 2663, Network Working Group, Aug. 1999, pp. 1-30, USA.

U.S. Patent and Trademark Office, "Office Action", U.S. Appl. No. 15/611,106, dated Aug. 9, 2019, pp. 1-17.

U.S. Patent and Trademark Office, "Notice of Allowance", U.S. Appl. No. 15/611,106, dated Oct. 17, 2019, pp. 1-8.

U.S. Patent and Trademark Office, "Office Action—Final Rejection", U.S. Appl. No. 15/611,074, dated Nov. 1, 2019, pp. 1-20.

U.S. Patent and Trademark Office, "Office Action", U.S. Appl. No. 15/611,074, dated May 24, 2019, pp. 1-18.

\* cited by examiner

IP SOURCE OBFUSCATION

RELATED APPLICATIONS

This application claims the benefit of U.S. Provisional Application No. 62/344,058, filed on Jun. 1, 2016, entitled "CYBER HARDENING AND AGILITY TECHNOLOGIES FOR TACTICAL IP NETWORKS", which is hereby incorporated herein by reference.

GOVERNMENT CONTRACTS

This invention was made with government support under contract FA8750-15-C-0254 awarded by the Air Force Research Laboratory (AFRL). The government may have certain rights in the invention.

BACKGROUND

A situational awareness application may be able to analyze IP multicast packets sent by one or more devices across a network to monitor those devices. Since packets are multicast, the situational awareness application can simply subscribe to the multicast stream to monitor it. The payload of the multicast packets can be encrypted to prevent the situational awareness application from gleaning the contents of the multicast packets, but the source address of the multicast packets is visible to the application. The application may be able to perform traffic analysis on the source IP address to elicit information such as the number of devices sending multicast packets and potentially, the location of the devices if a map of the network topology is known. Thus, the source IP addresses of multicast packets may provide information that it is desirable to protect.

BRIEF DESCRIPTION

Embodiments for a method of obfuscating a source of a multicast packet are provided. The method includes receiving a plurality of multicast packets at a first device from one or more second devices, the multicast packets received over one or more network links. A source internet protocol (IP) address of each multicast packet of the plurality of multicast packets is an IP address of the one or more second devices that sent the multicast packet. The source IP address of each of the plurality of multicast packets is changed to an IP address other than an IP address of the first device or an IP address of the one or more second devices. The plurality of multicast packets can then be sent.

Embodiments for a processor readable medium are also provided. The processor readable medium includes instructions stored thereon. The instructions, when executed by one or more processing devices, cause the one or more processing devices to configure a data plane of a networking device. The instructions cause the one or more processing devices to configure a data plane of a networking device to receive a plurality of multicast packets at the networking device from one or more second devices, wherein the multicast packets are received over one or more network links. A source internet protocol (IP) address of each multicast packet of the plurality of multicast packets is an IP address of the one or more second devices that sent the multicast packet. The instructions also configure the data plane to change the source IP address of each of the plurality of multicast packets to an IP address other than an IP address of the networking device or an IP address of the one or more second devices. The instructions also configure the data plane to send the plurality of multicast packets.

Embodiments for a networking device are also provided. The networking device includes one or more processing devices and a data storage medium coupled to the one or more processing devices. The data storage medium includes instructions stored thereon. The instructions, when executed by the one or more processing devices, cause the one or more processing devices to change a source IP address of multiple multicast packets received without regard to a true source of the multicast packets. The source IP address of each of the multicast packets is changed to an IP address other than an IP address of the networking device.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
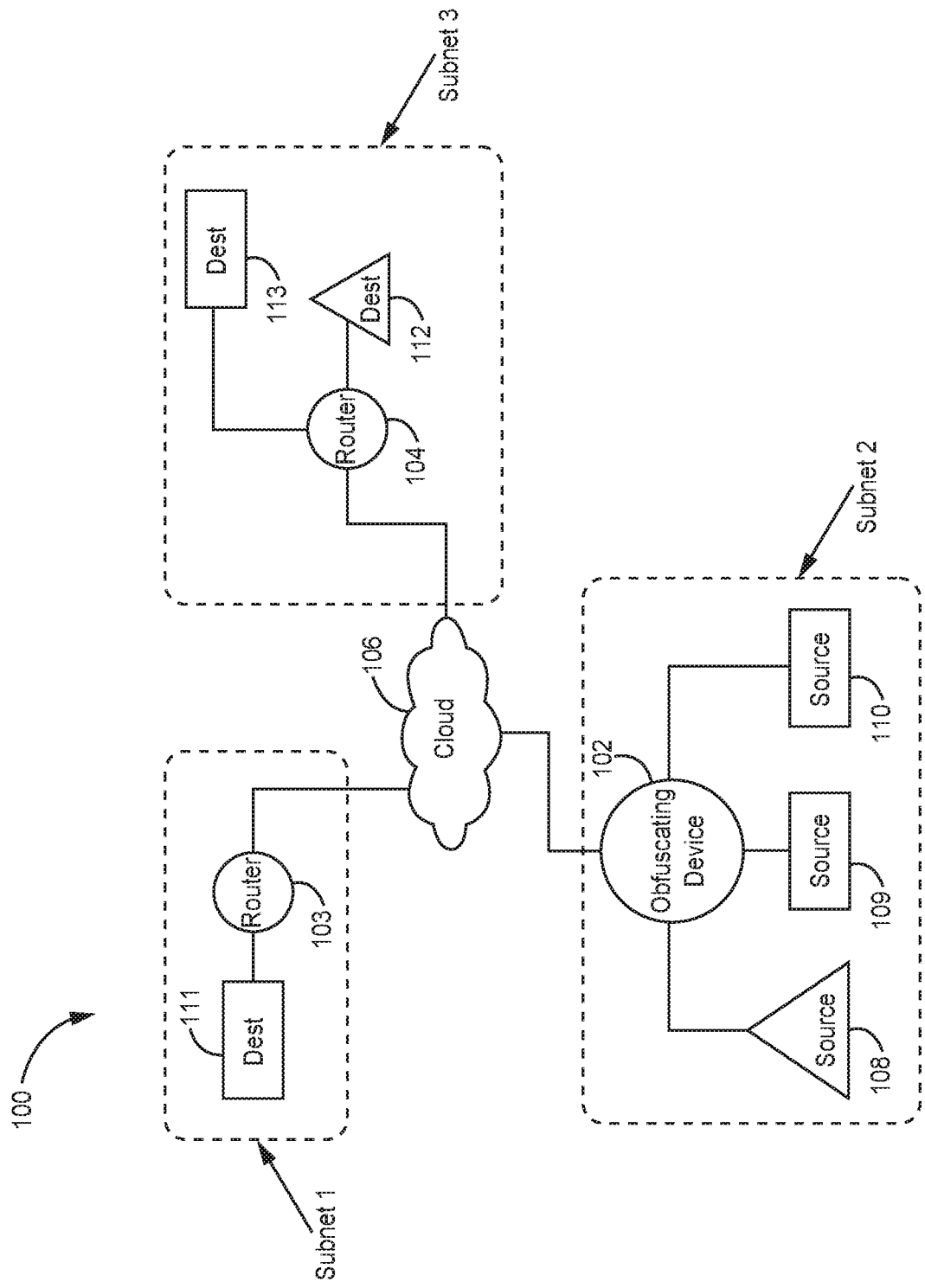
FIG. 1 is a block diagram of an example network having one or more devices that obfuscate a source of a multicast packet.

FIG. 1 is a block diagram of an example network 100 having one or more devices that obfuscate a source of a multicast packet. Network 100 includes an obfuscating device 102 communicatively coupled to one or more multicast sources 108-110. The one or more multicast sources 108-110 are communicatively coupled to the obfuscating device 102 via one or more respective network links. Each network link 101 of the network 100 can be a physical link implemented over one or more physical communication media (e.g., an Ethernet cable such as a cat-SE compliant cable) or can be a wireless link implemented using wireless signals. A multicast source 108-110 can be communicatively coupled to the obfuscating device 102 through a single network link, or multiple serial network links of any type (e.g., some wired, some wireless). In the example shown in FIG. 1, three multicast sources 108-110 are shown, however, any number of multicast sources can be communicatively coupled to the obfuscating device 102.

Internet protocol (IP) multicast packets sent from the multicast sources 108-110 are received by the obfuscating device 102. The obfuscating device 102 changes the source IP address of the multicast packets and forwards the multicast packets on towards destinations for the multicast packets. In the example shown in FIG. 1, the obfuscating device 102 is coupled to a cloud 106 of devices. One or more destinations 111-113 for the multicast packets are communicatively coupled to the cloud 106 of devices, for example, by suitable networking devices 103, 104.

The one or more multicast sources 108-110 are coupled behind the obfuscating device 102 with respect to the cloud 106 of devices, such that packets destined for the cloud 106 of devices and beyond are sent through the obfuscating device 102. The packets from the one or more multicast sources 108-110 can be received on a first one or more ports of the obfuscating device and, after having their source IP address changed if applicable, can be sent from a second one or more ports into the cloud 106 of devices.

Figure 2:
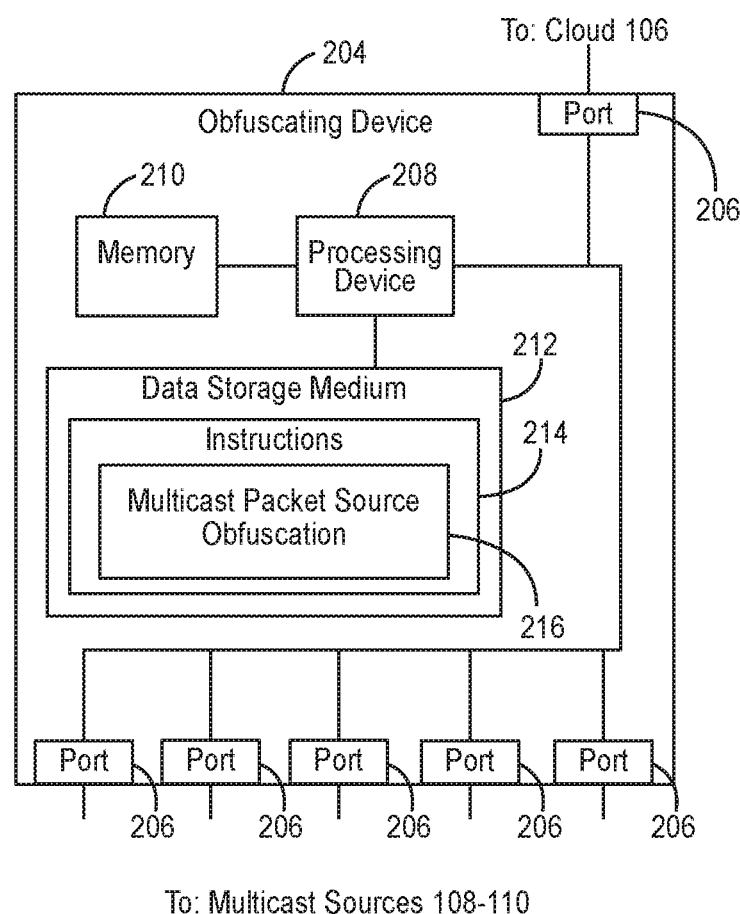
FIG. 2 is a block diagram of an example obfuscating device.

FIG. 2 is a block diagram of an example obfuscating device 102. The obfuscating device 102 includes one or more processing devices 208 coupled to memory 210. The one or more processing devices 208 can include any one or more of a general-purpose processor (e.g., a central processing unit (CPU)) and a special-purpose processor (e.g., a digital signal processor (DSP) or graphics processing unit (GPU)). Memory 210 can include any suitable form of random access memory (RAM) now known or later developed, such as dynamic random-access memory (DRAM), as well as other types of memory. The obfuscating device 102 also includes one or more data storage mediums 212 coupled to the one or more processing devices 208. The one or more data storage mediums 212 can include any suitable computer readable medium providing non-volatile data storage including, but not limited to, magnetic media such as a hard disk drive (HDD), optical media such as a CD, DVD, or Blu-ray disk, and non-volatile electric media such as a solid-state drive (SSD), flash media, or EEPROM. The obfuscating device 102 includes instructions 214 stored or otherwise embodied on its respective one or more data storage mediums 212. The instructions 214, when executed by the one or more processing devices 208 of the obfuscating device 102, cause the obfuscating device 102 to perform the actions coded in the instructions 214. The obfuscating device 102 can also include one or more ports 206 for sending and receiving packets. Packets received on the one or more ports can be acted on by the one or more processing devices 208 in accordance with the instructions 214.

In an example, the obfuscating device 102 is a networking device such as a network switch or a router. Such a network switch or router includes a data plane that implements forwarding rules to forward packets between the ports of the switch. The data plane of each switch is configured by a controller, which is a part of the control plane of the switch. The controller can be integrated into a common device (e.g., switch) with the data plane, as in a traditional switch, or can be implemented in a device distinct from the data plane, as in software defined networking (SDN). In either case, the controller can include the one or more processing devices 208, memory 210, one or more data storage mediums 212 and instructions 216 for obfuscating the source of an IP multicast packet received and forwarded by a data plane controlled by the controller.

Figure 3:
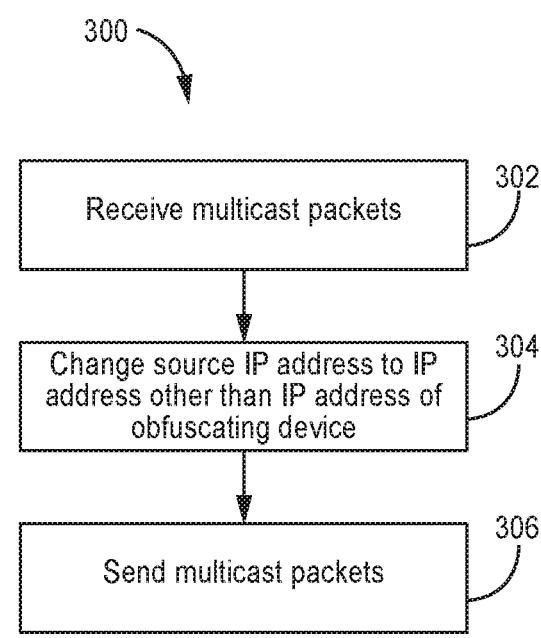
FIG. 3 is a flow diagram of an example method of obfuscating a multicast packet.

FIG. 3 is a flow diagram of a method 300 of obfuscating the source of an IP multicast packet. Method 300 includes receiving a plurality of IP multicast packets at an obfuscating device 102 from one or more multicast sources 108-110 (block 302). The plurality of multicast packets are received over one or more network links coupling the one or more multicast sources to the obfuscating device 102. A multicast packet is a packet that is address to (has a destination address of) an IP multicast address. Each of the plurality of multicast packets can have a source IP address that corresponds to the multicast source from which the multicast packet was sent. Thus, multicast packets sent by a first multicast source 108 can have a first IP address in their source IP address field, wherein the first IP address is the IP address of the first multicast source 108. Multicast packets sent by a second multicast source 109 can have a second IP address in their source IP address field, wherein the second IP address is the IP address of the second multicast source 109. Multicast packets sent by a third multicast source 110 can have a third IP address in their source IP address field, wherein the third IP address is the IP address of the third multicast source 110.

Accordingly, the source IP addresses of the multicast packets are accurate when received by the obfuscating device 102.

The obfuscating device 102 changes the source IP address of each of the plurality of multicast packets to obfuscate the source of each multicast packet (block 304). To obfuscate the source, the obfuscating device 102 changes to the source IP address to an IP address other than an IP address of the true source of the multicast packet. That is, for multicast packets sent by the first multicast source 108, the obfuscating device 102 changes the source IP address to an IP address other than the IP address of the first multicast source. Similarly, the source IP address of packets from the second multicast source 109 is changed to an IP address other than the IP address of the second multicast source 109 and the source IP address of packets from the third multicast source 110 is changed to an IP address other than the IP address of the third multicast source 110.

In an example, the (new) source IP address to which a multicast packet is changed, is an IP address other than an IP address of the obfuscating device 102. An IP address other than one of the obfuscating device 102 is selected in order to further obfuscate the sources of the multicast packets. By selecting an IP address other than one of the obfuscating device or the true source IP address, a downstream device receiving the packet will not know either the true source of the multicast packet or the source of (or even existence of) the obfuscating device 102.

In an example, different multicast packets can be changed to different source IP addresses. This can occur regardless of the true source of the multicast packets. For example, for multiple multicast packets received from a single multicast source (e.g., the first multicast source 108), some of the multiple multicast packets can be changed to a fourth source IP address while others of the multiple multicast packets can be changed to a fifth source IP address. Similarly, for multiple packets from the second multicast source 109, some of the multiple multicast packets can be changed to the fourth source IP address while others of the multiple multicast packets can be changed to the fifth source IP address. In other examples, more than two different source IP addresses can be used amongst the multiple packets. In some examples, a large set of IP addresses can be used for the new IP addresses such that IP address are infrequently re-used. In other examples, the new IP addresses can be selected pseudo-randomly. In an example, some or all of the new IP addresses used can be IP addresses that are outside of a subnet of the true source 108-110 of the particular multicast packet and/or outside a subnet of the obfuscating device 102. Use of multiple different source IP addresses amongst a plurality of packets can obfuscate the true source(s) 108-110 of the multicast packets by making it appear to a downstream application that there are more and/or different sources than there actually are.

In other examples, the multicast packets from multiple sources can be changed to have a common source IP address to make it appear as though there is only a single source, when in fact there are multiple sources. In such an example, the obfuscating device 102 can change packets from the first multicast source to have a sixth source IP address and packets from the second multicast source to have the sixth source IP address. The common source IP addresses can be selected from one of the true sources of the plurality of packets (e.g., the third multicast source 110) or can be an IP address other than the IP addresses of the multicast sources 108-110. In an example, the common source IP address can be an IP address other than an IP address of the obfuscating device. In an example, the common source IP address can be an IP address that is outside of a subnet of the obfuscating device 102 and any of the multicast source(s) 108-110.

In some examples, the obfuscating device 102 can intermittently not change one or more multicast packets, to further confuse analysis by a downstream application. In some examples, the obfuscating device 102 can change the source IP address of multicast packets from some sources, but not change the source IP address of multicast packets from other sources. Since the source of unicast packets is more critical to communication protocols (e.g., for return communications) and since it is more difficult for a downstream application to receive an unintended unicast packet (because the application cannot simply subscribe to a multicast stream as is the case for multicast packets), the obfuscating device 102 can change the source IP address of multicast packets while leaving the source IP address of other packets (unicast, broadcast) unchanged. In some examples, the obfuscating device 102 can switch source address changing processes over time. For example, for a first number multicast packets, the obfuscating device 102 can change all source IP addresses to a common IP address. Once the first number of multicast packets is received, the obfuscating device 102 can change all source addresses for a second number of multicast packets to a pseudo-random IP address. Any number of different source address changing processes can be used.

Once a multicast packet has had its source IP address changed, if applicable, the multicast packet is sent by the obfuscating device 102 in the normal manner of sending the multicast packet towards its destinations (block 306).

In some examples, multiple obfuscating devices 102 can be used in the network 100, each obfuscating device 102 receiving multicast packets from different multicast sources. The multiple obfuscating devices 102 can communicate over the network to coordinate source address changing processes. Through such coordination, multiple obfuscating devices 102 can change the source IP addresses of multicast packets received to a common IP address, such that multicast packets from sources behind a first obfuscating device 102 are changed to have a common source IP address with multicast packets behind a second obfuscating device 102. In other examples, the coordination can be used to ensure a new source IP address for a packet is selected outside of a subnet of other obfuscating devices 102 as well as outside a subnet of the obfuscating device 102 making the change.

In yet other examples, an obfuscating device 102 can communication with a downstream device to inform the downstream device of the true identity(ies) of the multicast packets. Information in the changed multicast packets can be used to identify the true source. For example, multicast packets from the first multicast source 108 can be mapped to a seventh IP address and the obfuscating device 102 can indicate to the downstream device that multicast packets having the seventh IP address in the source IP address field are multicast packets from the first multicast source 108. Other fields or combinations of fields in the multicast packet can be used to identify the true source of multicast packet in other examples.

In some examples, packets from a first one or more multicast sources are obfuscating using method 300, while packets from other multicast sources are not obfuscated. The obfuscating device 102 can differentiate between packets from different sources in any suitable manner including based on the (original) IP source address or the port of the obfuscating device 102 on which a packet is received.

Using the techniques described herein, an obfuscating device can obfuscate all, or a suitable number, of packets from a multicast source to hide the true identity of the multicast source to downstream devices. Advantageously, this obfuscation can be accomplished without requiring any update to the multicast source itself. The obfuscating device is compatible with conventional multicast sources.

What is claimed is:

1. A method of obfuscating a source of a multicast packet, the method comprising:
   receiving a plurality of unicast packets and a plurality of multicast packets at a first device, the unicast packets and the multicast packets received over one or more network links, wherein a source internet protocol (IP) address of each unicast packet and each multicast packet of the plurality of unicast packets and the plurality of multicast packets is an IP address of a second device;
   changing the source IP address of each of the plurality of multicast packets to an IP address other than an IP address of the first device or an IP address of the second device;
   sending the plurality of multicast packets with their changed source IP addresses into a network toward their respective destinations; and
   sending the plurality of unicast packets with their source IP addresses unchanged into the network toward their respective destinations.

2. The method of claim 1, wherein the first device is one of a network switch or a router, wherein the plurality of multicast packets and the plurality of unicast packets are received on a first one or more ports and the plurality of multicast packets and the plurality of unicast packets are sent on a second port.

3. The method of claim 1, comprising:
   intermittently sending a multicast packet received from the second device without changing a source IP address of the multicast packet.

4. The method of claim 1, changing the source IP address of at least one of the multicast packets to a first IP address and changing the source IP address of at least one other of the multicast packets to a second IP address.

5. The method of claim 1, wherein changing the source IP address includes, for each multicast packet of the plurality of multicast packets, pseudo-randomly selecting a new IP address and changing the source IP address of the multicast packet to the new IP address.

6. The method of claim 1, comprising:
   receiving a second plurality of multicast packets having a source IP address of a third device; and
   changing a source IP address of each of the plurality of multicast packets from the second device and each of the second plurality of multicast packets from the third device to a common IP address, wherein the common IP address is not an IP address of the first device.

7. The method of claim 6, wherein the common IP address is an IP address of a fourth device sending multicast packets to the first device.

8. The method of claim 1, wherein changing the source IP address includes selecting a source IP address that is outside of a subnet of the first device and outside of a subnet of the second device; and
   changing the source IP address for a multicast packet to the selected source IP address.

9. The method of claim 1, comprising:
   varying the one or more IP addresses to which multicast packets are changed over time.

10. The method of claim 1, comprising:
coordinating the one or more IP addresses to which multicast packets are changed to with another obfuscating device.

11. The method of claim 1, comprising:
communicating to a downstream device, an indication of a true source of a multicast packet having a changed source IP address.

12. A non-transitory processor readable medium comprising:
instructions stored thereon, wherein the instructions, when executed by one or more processing devices, cause the one or more processing devices to configure a data plane of a networking device to:
receive a plurality of unicast packets and a plurality of multicast packets at the networking device, the unicast packets and the multicast packets received over one or more network links, wherein a source internet protocol (IP) address of each unicast packet and each multicast packet of the plurality of unicast packets and the plurality of multicast packets is an IP address of a second device;
change the source IP address of each of the plurality of multicast packets to an IP address other than an IP address of the networking device or an IP address of the second device;
send the plurality of multicast packets with their changed source IP addresses into a network toward their respective destinations; and
send the plurality of unicast packets with their source IP address unchanged into the network toward their respective destinations.

13. The processor readable medium of claim 12, wherein the instructions cause the one or more processing devices to configure the data plane to:
intermittently send a multicast packet received from the second device without changing a source IP address of the multicast packet.

14. The processor readable medium of claim 12, wherein the instructions cause the one or more processing devices to configure the data plane to; change the source IP address for different packets of the plurality of multicast packets to different IP addresses.

15. The processor readable medium of claim 14, wherein the instructions cause the one or more processing devices to configure the data plane to:
receive a second plurality of multicast packets having a source IP address of a third device; and
change a source IP address of at least one of the second plurality of multicast packets to a source address to which a multicast packet of the plurality of multicast packets from the second device was changed.

16. The processor readable medium of claim 12, wherein change the source IP address includes:
select a source IP address that is outside of a subnet of the first device and outside of a subnet of the second device; and
change the source IP address for a multicast packet to the selected source IP address.

17. The processor readable medium of claim 12, wherein change the source IP address includes, for each multicast packet of the plurality of multicast packets:
pseudo-randomly select a new IP address; and
change the source IP address of the multicast packet to the new IP address.

18. The processor readable medium of claim 12, wherein the instructions cause the one or more processing devices to configure the data plane to:
receive a second plurality of multicast packets having a source IP address of a third device; and
change a source IP address of each of the plurality of multicast packets from the second device and each of the second plurality of multicast packets from the third device to a common IP address, wherein the common IP address is not an IP address of the first device.

19. The processor readable medium of claim 12, wherein the instructions cause the one or more processing devices to configure the data plane to:
communicate to a downstream device, an indication of a true source of a multicast packet having a changed source IP address.

20. A networking device comprising:
one or more processing devices;
a data storage medium coupled to the one or more processing devices, the data storage medium having instructions stored thereon, wherein the instructions, when executed by the one or more processing devices, cause the one or more processing devices to:
receive a plurality of unicast packets and a plurality of multicast packets from a second device, the plurality of unicast packets and the plurality of multicast packets having a source internet protocol (IP) address of the second device;
change the source IP address of the plurality of multicast packets, wherein the source IP address of each of the plurality of multicast packets is changed to an IP address other than an IP address of the networking device;
send the plurality of multicast packets with their changed source IP address into a network toward their respective destinations; and
send the plurality of unicast packets into the network toward their respective destinations without changing their source IP addresses.

* * * * *